(12) United States Patent
Fahim et al.

(10) Patent No.: US 9,405,687 B2
(45) Date of Patent: Aug. 2, 2016

(54) METHOD, APPARATUS AND SYSTEM FOR HANDLING CACHE MISSES IN A PROCESSOR

(71) Applicant: Intel Corporation, Santa Clara, CA (US)

(72) Inventors: Bahaa Fahim, San Jose, CA (US); Samuel D. Strom, Folsom, CA (US); Vedaraman Geetha, Fremont, CA (US); Robert G. Blankenship, Tacoma, WA (US); Yen-Cheng Liu, Portland, OR (US); Krishnakumar Ganapathy, Portland, OR (US); Cesar Maldonado, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 122 days.

(21) Appl. No.: 14/070,864

(22) Filed: Nov. 4, 2013

(65) Prior Publication Data

US 2015/0127907 A1 May 7, 2015

(51) Int. Cl.
*G06F 12/08* (2016.01)

(52) U.S. Cl.
CPC ........ *G06F 12/0813* (2013.01); *G06F 12/0831* (2013.01); *G06F 12/0884* (2013.01); *G06F 2212/2542* (2013.01); *Y02B 60/1225* (2013.01)

(58) Field of Classification Search
None
See application file for complete search history.

(56) References Cited

U.S. PATENT DOCUMENTS

| | | | |
|---|---|---|---|
| 6,009,488 A | 12/1999 | Kavipurapu | |
| 6,226,722 B1 * | 5/2001 | Shippy et al. | 711/168 |
| 7,165,131 B2 | 1/2007 | Creta | |
| 7,210,000 B2 | 4/2007 | Creta | |
| 7,213,087 B1 * | 5/2007 | Bertone et al. | 710/56 |
| 7,512,741 B1 | 3/2009 | Batson et al. | |
| 7,689,778 B2 | 3/2010 | Liu et al. | |
| 7,937,534 B2 | 5/2011 | Madukkarumukumana | |
| 8,169,850 B2 | 5/2012 | Sistla et al. | |
| 2006/0053258 A1 | 3/2006 | Liu | |
| 2007/0150664 A1 | 6/2007 | Dombrowski et al. | |
| 2010/0005242 A1 * | 1/2010 | Cantin | 711/122 |
| 2010/0274975 A1 | 10/2010 | Sistla et al. | |
| 2011/0153924 A1 | 6/2011 | Vash et al. | |
| 2011/0191542 A1 | 8/2011 | Vash et al. | |
| 2012/0047333 A1 | 2/2012 | Kottapalli et al. | |
| 2013/0151782 A1 | 6/2013 | Liu et al. | |
| 2014/0089592 A1 * | 3/2014 | Biswas et al. | 711/133 |

OTHER PUBLICATIONS

Intel Corporation, "An Introduction to the Intel QuickPath Interconnect," Jan. 2009, pp. 1-22.

* cited by examiner

*Primary Examiner* — Jared Rutz
*Assistant Examiner* — William E Baughman
(74) *Attorney, Agent, or Firm* — Trop, Pruner & Hu, P.C.

(57) ABSTRACT

In an embodiment, a processor includes one or more cores, and a distributed caching home agent (including portions associated with each core). Each portion includes a cache controller to receive a read request for data and, responsive to the data not being present in a cache memory associated with the cache controller, to issue a memory request to a memory controller to request the data in parallel with communication of the memory request to a home agent, where the home agent is to receive the memory request from the cache controller and to reserve an entry for the memory request. Other embodiments are described and claimed.

22 Claims, 7 Drawing Sheets

METHOD, APPARATUS AND SYSTEM FOR HANDLING CACHE MISSES IN A PROCESSOR

TECHNICAL FIELD

This disclosure pertains to computing systems, and more particularly to cache management in such systems.

DETAILED DESCRIPTION

Figure 1:
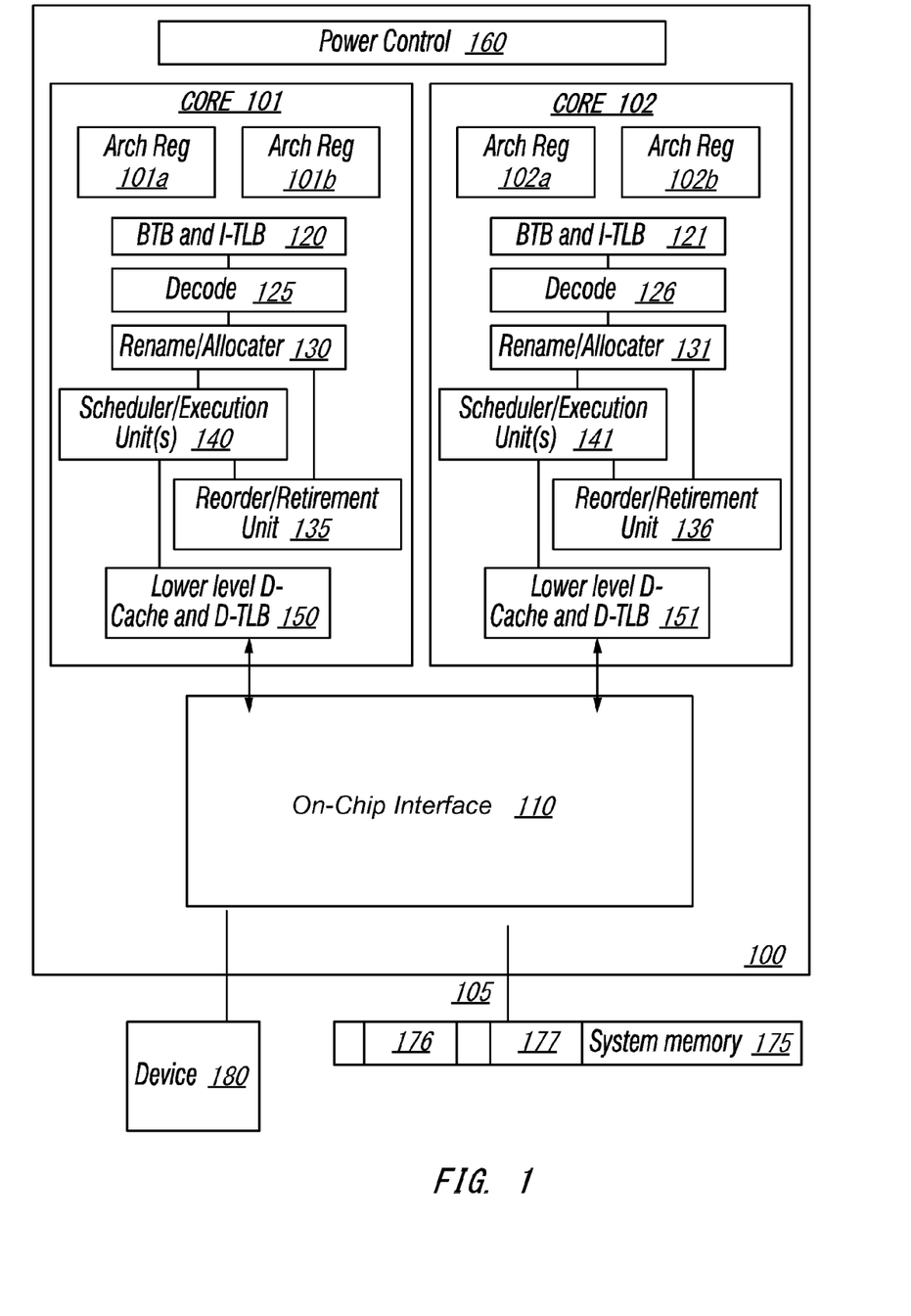
FIG. 1 is a block diagram for a computing system including a multicore processor.

Referring to FIG. 1, an embodiment of a block diagram for a computing system including a multicore processor is depicted. Processor 100 includes any processor or processing device, such as a microprocessor, an embedded processor, a digital signal processor (DSP), a network processor, a handheld processor, an application processor, a co-processor, a system on a chip (SOC), or other device to execute code. Processor 100, in one embodiment, includes at least two cores—core 101 and 102, which may include asymmetric cores or symmetric cores (the illustrated embodiment). However, processor 100 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 100, as illustrated in FIG. 1, includes two cores—core 101 and 102. Here, core 101 and 102 are considered symmetric cores, i.e. cores with the same configurations, functional units, and/or logic. In another embodiment, core 101 includes an out-of-order processor core, while core 102 includes an in-order processor core. However, cores 101 and 102 may be individually selected from any type of core, such as a native core, a software managed core, a core adapted to execute a native Instruction Set Architecture (ISA), a core adapted to execute a translated Instruction Set Architecture (ISA), a co-designed core, or other known core. In a heterogeneous core environment (i.e. asymmetric cores), some form of translation, such a binary translation, may be utilized to schedule or execute code on one or both cores. Yet to further the discussion, the functional units illustrated in core 101 are described in further detail below, as the units in core 102 operate in a similar manner in the depicted embodiment.

As depicted, core 101 includes two hardware threads 101a and 101b, which may also be referred to as hardware thread slots 101a and 101b. Therefore, software entities, such as an operating system, in one embodiment potentially view processor 100 as four separate processors, i.e., four logical processors or processing elements capable of executing four software threads concurrently. As alluded to above, a first thread is associated with architecture state registers 101a, a second thread is associated with architecture state registers 101b, a third thread may be associated with architecture state registers 102a, and a fourth thread may be associated with architecture state registers 102b. Here, each of the architecture state registers (101a, 101b, 102a, and 102b) may be referred to as processing elements, thread slots, or thread units, as described above. As illustrated, architecture state registers 101a are replicated in architecture state registers 101b, so individual architecture states/contexts are capable of being stored for logical processor 101a and logical processor 101b. In core 101, other smaller resources, such as instruction pointers and renaming logic in allocator and renamer block 130 may also be replicated for threads 101a and 101b. Some resources, such as re-order buffers in reorder/retirement unit 135, ILTB 120, load/store buffers, and queues may be shared through partitioning. Other resources, such as general purpose internal registers, page-table base register(s), low-level data-cache and data-TLB 150, execution unit(s) 140, and portions of reorder/retirement unit 135 are potentially fully shared.

Processor 100 often includes other resources, which may be fully shared, shared through partitioning, or dedicated by/to processing elements. In FIG. 1, an embodiment of a purely exemplary processor with illustrative logical units/resources of a processor is illustrated. Note that a processor may include, or omit, any of these functional units, as well as include any other known functional units, logic, or firmware not depicted. As illustrated, core 101 includes a simplified, representative out-of-order (OOO) processor core. But an in-order processor may be utilized in different embodiments. The OOO core includes a branch target buffer 120 to predict branches to be executed/taken and an instruction-translation buffer (I-TLB) 120 to store address translation entries for instructions.

Core 101 further includes decode module 125 coupled to a fetch unit to decode fetched elements. Fetch logic, in one embodiment, includes individual sequencers associated with thread slots 101*a*, 101*b*, respectively. Usually core 101 is associated with a first ISA, which defines/specifies instructions executable on processor 100. Often machine code instructions that are part of the first ISA include a portion of the instruction (referred to as an opcode), which references/specifies an instruction or operation to be performed. Decode logic 125 includes circuitry that recognizes these instructions from their opcodes and passes the decoded instructions on in the pipeline for processing as defined by the first ISA. For example, as discussed in more detail below decoders 125, in one embodiment, include logic designed or adapted to recognize specific instructions, such as transactional instruction. As a result of the recognition by decoders 125, the architecture or core 101 takes specific, predefined actions to perform tasks associated with the appropriate instruction. It is important to note that any of the tasks, blocks, operations, and methods described herein may be performed in response to a single or multiple instructions; some of which may be new or old instructions. Note decoders 126, in one embodiment, recognize the same ISA (or a subset thereof). Alternatively, in a heterogeneous core environment, decoders 126 recognize a second ISA (either a subset of the first ISA or a distinct ISA).

In one example, allocator and renamer block 130 includes an allocator to reserve resources, such as register files to store instruction processing results. However, threads 101*a* and 101*b* are potentially capable of out-of-order execution, where allocator and renamer block 130 also reserves other resources, such as reorder buffers to track instruction results. Unit 130 may also include a register renamer to rename program/instruction reference registers to other registers internal to processor 100. Reorder/retirement unit 135 includes components, such as the reorder buffers mentioned above, load buffers, and store buffers, to support out-of-order execution and later in-order retirement of instructions executed out-of-order.

Scheduler and execution unit(s) block 140, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 150 are coupled to execution unit(s) 140. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 101 and 102 share access to higher-level or further-out cache, such as a second level cache associated with on-chip interface 110. Note that higher-level or further-out refers to cache levels increasing or getting further way from the execution unit(s). In one embodiment, higher-level cache is a last-level data cache—last cache in the memory hierarchy on processor 100—such as a second or third level data cache. However, higher level cache is not so limited, as it may be associated with or include an instruction cache. A trace cache—a type of instruction cache—instead may be coupled after decoder 125 to store recently decoded traces. Here, an instruction potentially refers to a macro-instruction (i.e. a general instruction recognized by the decoders), which may decode into a number of micro-instructions (micro-operations).

In the depicted configuration, processor 100 also includes on-chip interface module 110. Historically, a memory controller, which is described in more detail below, has been included in a computing system external to processor 100. In this scenario, on-chip interface 110 is to communicate with devices external to processor 100, such as system memory 175, a chipset (often including a memory controller hub to connect to memory 175 and an I/O controller hub to connect peripheral devices), a memory controller hub, a northbridge, or other integrated circuit. And in this scenario, bus 105 may include any known interconnect, such as multi-drop bus, a point-to-point interconnect, a serial interconnect, a parallel bus, a coherent (e.g. cache coherent) bus, a layered protocol architecture, a differential bus, and a GTL bus.

Memory 175 may be dedicated to processor 100 or shared with other devices in a system. Common examples of types of memory 175 include DRAM, SRAM, non-volatile memory (NV memory), and other known storage devices. Note that device 180 may include a graphic accelerator, processor or card coupled to a memory controller hub, data storage coupled to an I/O controller hub, a wireless transceiver, a flash device, an audio controller, a network controller, or other known device.

Recently however, as more logic and devices are being integrated on a single die, such as SOC, each of these devices may be incorporated on processor 100. For example in one embodiment, a memory controller hub is on the same package and/or die with processor 100. Here, a portion of the core (an on-core portion) 110 includes one or more controller(s) for interfacing with other devices such as memory 175 or a graphics device 180. The configuration including an interconnect and controllers for interfacing with such devices is often referred to as an on-core (or un-core configuration). As an example, on-chip interface 110 includes a ring interconnect for on-chip communication and a high-speed serial point-to-point link 105 for off-chip communication. Yet, in the SOC environment, even more devices, such as the network interface, co-processors, memory 175, graphics processor 180, and any other known computer devices/interface may be integrated on a single die or integrated circuit to provide small form factor with high functionality and low power consumption.

In one embodiment, processor 100 is capable of executing a compiler, optimization, and/or translator code 177 to compile, translate, and/or optimize application code 176 to support the apparatus and methods described herein or to interface therewith. A compiler often includes a program or set of programs to translate source text/code into target text/code. Usually, compilation of program/application code with a compiler is done in multiple phases and passes to transform hi-level programming language code into low-level machine or assembly language code. Yet, single pass compilers may still be utilized for simple compilation. A compiler may utilize any known compilation techniques and perform any known compiler operations, such as lexical analysis, preprocessing, parsing, semantic analysis, code generation, code transformation, and code optimization.

Larger compilers often include multiple phases, but most often these phases are included within two general phases: (1) a front-end, i.e. generally where syntactic processing, semantic processing, and some transformation/optimization may take place, and (2) a back-end, i.e. generally where analysis, transformations, optimizations, and code generation takes place. Some compilers refer to a middle, which illustrates the blurring of delineation between a front-end and back end of a compiler. As a result, reference to insertion, association, generation, or other operation of a compiler may take place in any of the aforementioned phases or passes, as well as any other known phases or passes of a compiler. As an illustrative example, a compiler potentially inserts operations, calls, functions, etc. in one or more phases of compilation, such as insertion of calls/operations in a front-end phase of compilation and then transformation of the calls/operations into lower-level code during a transformation phase. Note that during dynamic compilation, compiler code or dynamic optimization code may insert such operations/calls, as well as optimize the code for execution during runtime. As a specific illustrative example, binary code (already compiled code) may be dynamically optimized during runtime. Here, the program code may include the dynamic optimization code, the binary code, or a combination thereof.

Similar to a compiler, a translator, such as a binary translator, translates code either statically or dynamically to optimize and/or translate code. Therefore, reference to execution of code, application code, program code, or other software environment may refer to: (1) execution of a compiler program(s), optimization code optimizer, or translator either dynamically or statically, to compile program code, to maintain software structures, to perform other operations, to optimize code, or to translate code; (2) execution of main program code including operations/calls, such as application code that has been optimized/compiled; (3) execution of other program code, such as libraries, associated with the main program code to maintain software structures, to perform other software related operations, or to optimize code; or (4) a combination thereof.

Figure 2:
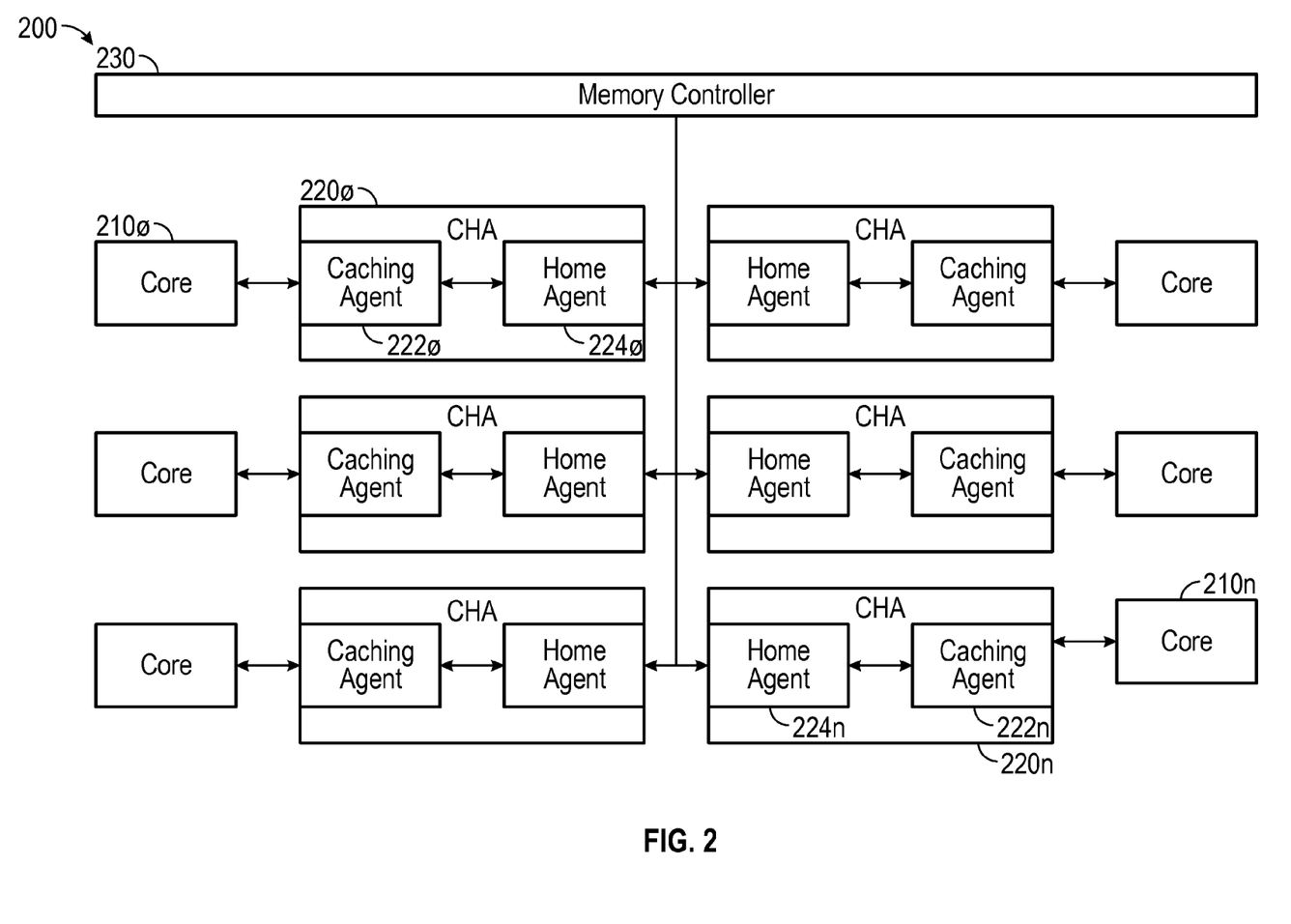
FIG. 2 is a block diagram of a multicore processor in accordance with an embodiment of the present invention.

Referring now to FIG. 2, shown is a block diagram of a multicore processor in accordance with an embodiment of the present invention. As shown in FIG. 2, processor 200 includes a plurality of cores $210_o$-$210_n$. Each of these cores may be homogeneous cores or one or more of the cores may be of a heterogeneous design. For example, some of the cores may be relatively simple in-order cores, while others of the cores may be out-of-order cores. Each core is coupled to a combined caching agent and home agent, referred to herein in as a caching home agent (CHA) 220. In general CHA 220 serves as the local coherence and cache controller (via cache controller 222, also referred to herein as a caching agent), and also serves (via home agent 224) as the global coherence and memory controller interface.

In an embodiment CHA 220 may be of a distributed design, including each of the distributed CHAs $210_o$-$210_n$ associated with one of the cores. As seen, each CHA 220 includes a caching agent 222 and a home agent 224. In general, caching agent 222 is a cache controller and/or other logic that is associated with a corresponding portion of a cache memory, such as a distributed portion of a last level cache (LLC). In turn, home agent 224 is configured to protect a given portion of a memory such as a system memory coupled to the processor. To enable communications with such memory, each of CHAs 220 is coupled to a memory controller 230 which in an embodiment is an internal memory controller of the processor that provides an interface to a system memory such as a given type of dynamic random access memory (DRAM). With the implementation shown in FIG. 2, the memory access path from caching agent 222 to memory controller 230 does not naturally traverse a corresponding home agent 224 along the path to memory controller 230. Having cache miss reads diverted in order to traverse a home agent prior to issuance to the memory controller may add latency. Embodiments enable a low latency memory access path for distributed home agent designs.

Although particular components are shown in FIG. 2, understand that a processor such as a multicore processor may include other components including other non-core circuitry, commonly referred to as an uncore. Such circuitry may include an interconnect fabric, interfaces to off-chip devices, and a power control unit among many other components such as an internal voltage regulator. However, for ease of illustration such additional components of the processor are not shown. Furthermore, understand that the components shown, including the CHA, its constituent components, the cores and the memory controller themselves are formed of a variety of different logic blocks and circuits, details of which are not shown so as not to obscure the discussion herein.

Given the distributed and combined caching home agent of the FIG. 2 processor, memory request protocols may be modified to reduce latency, particularly in the case where a system is lightly loaded. Stated another way, embodiments enable faster memory request processing when a system is lightly loaded, even with the situation shown in FIG. 2 in which a memory access path from a caching agent to the memory controller does not naturally traverse a single consolidated home agent on the path to the memory controller.

According to embodiments, upon a cache miss for a read request the caching agent forwards a read request to the memory controller in parallel with issuance of the read request to the home agent in order to register the request in the home agent tracker. The direct read request is issued from the caching agent to the memory controller based on an early hint from the home agent. In an embodiment, the home agent takes into account memory controller read credit pools as well as pending read requests to the memory controller that are in the process of acquiring a credit in the home agent. This ensures that memory controller responses arriving at the home agent find the home agent tracker in the correct state which is consistent with a read being issued to the memory controller (namely that an entry for the request is pending in the tracker). As such, embodiments may reduce memory access latency as serial traversing of a home agent prior to communication of a request to a memory controller can be avoided.

Figure 3:
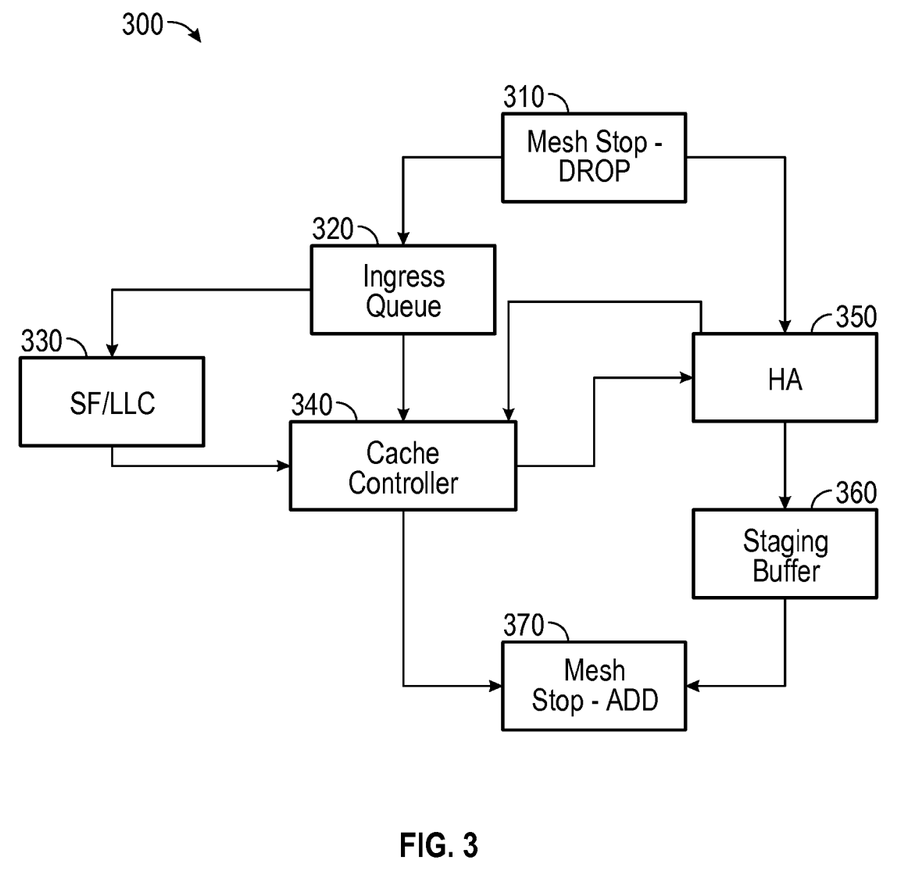
FIG. 3 is a block diagram of a CHA in accordance with an embodiment of the present invention.

Referring now to FIG. 3, shown is a block diagram of further details of a CHA in accordance with an embodiment of the present invention. As shown in FIG. 3, CHA 300 is a representation of components of one CHA, which may be one of many distributed CHAs that collectively form a coherent combined caching home agent for a processor. In general, CHA 300 includes various components that couple between interconnect interfaces. Specifically, a first interconnect stop 310 provides inputs to CHA 300 while a second interconnect stop 370 provides outputs from the CHA. In an embodiment, a processor may include an interconnect fabric such as a mesh interconnect so that stops 310 and 370 are configured as mesh stops to respectively receive incoming information and to output outgoing information.

As illustrated, first interconnect stop 310 is coupled to an ingress queue 320 that may include one or more entries to receive incoming requests and pass them along to appropriate portions of the CHA. In the implementation shown, ingress queue 320 is coupled to a portion of a cache memory hierarchy, specifically a snoop filter and a last level cache (LLC) 330. In general, a snoop filter may be a distributed portion of a directory that includes a plurality of entries that store tag information used to determine whether incoming requests hit in a given portion of a cache memory. In turn, LLC 330 may be a slice or other portion of a distributed last level cache and may include a plurality of entries to store tag information, cache coherency information and data as a set of cache lines.

Cache controller 340 in turn may include various logic to perform cache processing operations. In general, cache controller 340 may be configured as a pipelined logic that further includes a table of requests (TOR) which may include various entries to store incoming requests to be processed. As further seen, snoop filter/LLC 330 couples to cache controller 340. As will be described herein, information may be communicated via this coupling when a read request does not hit in the snoop filter/LLC. In general, cache controller 340 is responsible for local coherency and interfacing with the snoop filter and LLC.

As further shown, cache controller 340 also couples to a home agent 350 which may include logic and other structures used to interface with and protect a corresponding portion of a system memory. In general, home agent 350 may include one or more trackers each having a plurality of entries to store pending requests and to enable these requests to be processed through a memory hierarchy. For read requests that miss the snoop filter/LLC, home agent 350 registers the request in a tracker, determines if snoops are to be spawned, and/or memory reads are to be issued based on a number of conditions. In an embodiment, the cache memory pipeline is roughly 9 clock cycles, and the home agent pipeline is roughly 4 clock cycles. This allows CHA 300 to produce a minimal memory/cache miss latency using an integrated home agent.

Next as seen in FIG. 3, outgoing requests from home agent 350 couple through a staging buffer 360 and to interconnect stop 370. As further illustrated in FIG. 3, in certain situations cache controller 340 may directly send memory requests to a memory controller (not shown in FIG. 3) via interconnect stop 370. Note that such memory requests may be handled with reduced latency, as the latency incurred in passing these requests to home agent 350 can be avoided. Note that even in cases where these memory requests are directly sent to the memory controller from cache controller 340, the same memory requests may also be sent in parallel to home agent 350 for home agent processing to reserve resources of the home agent for the read request (and thus the incoming receipt of data via a completion as received from interconnect stop 310) can occur. Although shown at this high level in the embodiment of FIG. 3, understand the scope of the present invention is not limited in this regard.

Figure 4:
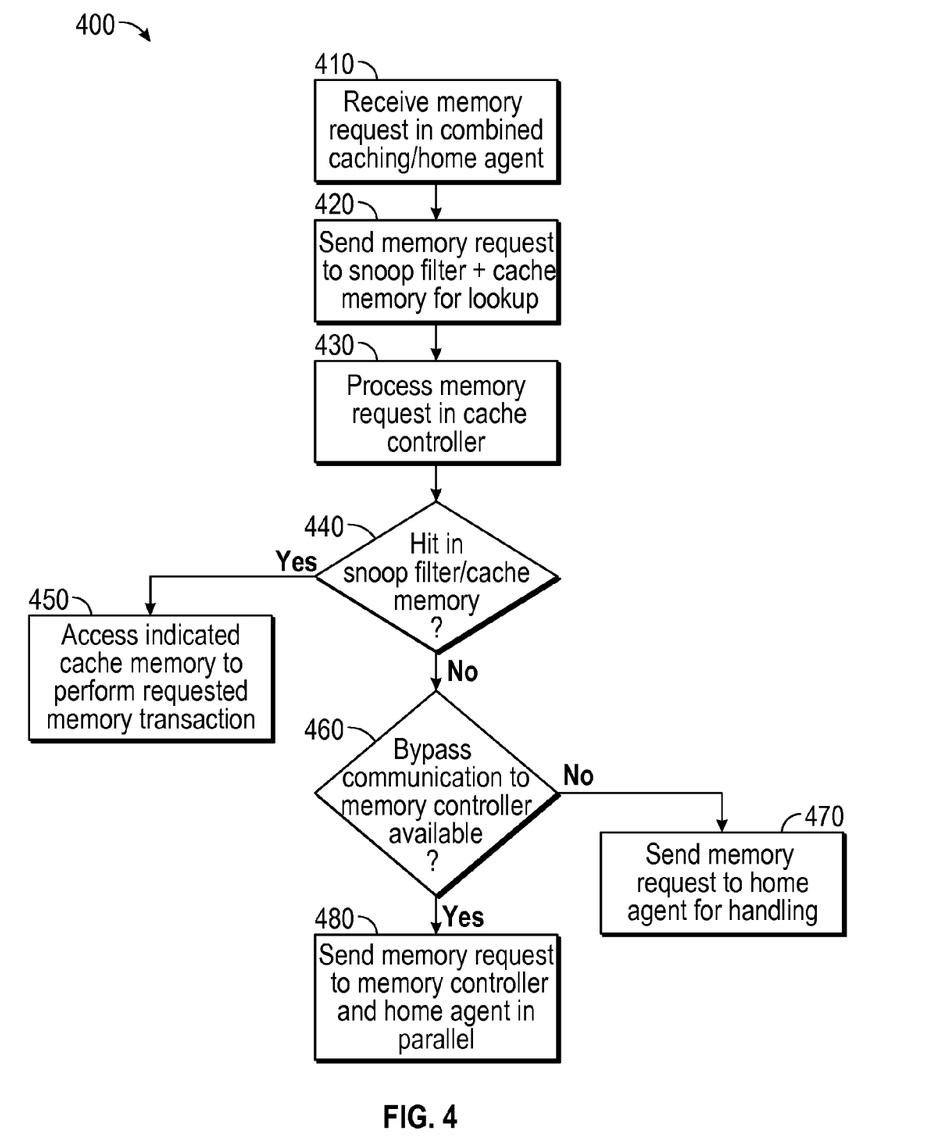
FIG. 4 is a flow diagram of a method for processing memory requests in accordance with an embodiment of the present invention.

Next referring to FIG. 4, shown is a flow diagram of a method for processing memory requests in accordance with an embodiment of the present invention. Method 400 may be implemented at least in part using a CHA having a cache controller logic as described herein. Method 400 begins by receiving a memory request in a combined caching/home agent (block 410). For purposes of discussion assume that this memory request is a read request seeking to obtain data for a requester which may be a given core or other agent of a processor or another component of a system including the processor. Of course, in other embodiments other memory requests may be received and handled as discussed.

Next, control passes to block 420 where the memory request may be sent to a snoop filter and cache memory for lookup to determine whether the requested data is present either in the cache memory or other location as indicated by the snoop filter. In some embodiments, the cache memory may be an LLC and the snoop filter may be implemented at least in part via a set of entries of the LLC including tag information.

In parallel while these components access their entries to determine whether the requested data is present, the cache controller performs various processing on the memory request (block 430). For example, this processing may include various preparatory actions with regard to the memory request including proceeding through a pipelined logic of the cache controller to determine appropriate cache coherency operations. Next, it may be determined whether a hit occurs in the snoop filter/cache memory (diamond 440). This hit thus indicates the presence of the requested data in the cache memory or a location associated with the snoop filter. If such hit occurs, control passes to block 450 where access to the indicated cache memory occurs to perform the requested memory transaction, which here corresponds to obtaining the requested read data and providing it back to the requester.

If instead it is determined that there is no hit and a miss occurs, control passes to diamond 460 where a determination may be made as to whether a bypass communication path to a memory controller is available. This bypass path may be a direct communication from the cache controller to the memory controller (through various interconnect mechanisms and possibly one or more queuing structures). Via this direct communication, reduced latency in handling the memory request is realized. However, not all requests may be communicated in this manner due to system loading. Thus such direct communication occurs based on availability of this bypass communication path.

More specifically, in an embodiment the availability may be based on whether the memory controller has resources sufficient to handle the incoming request. Although the scope of the present invention is not limited in this regard in an embodiment this resource availability is determined by a home agent of the CHA, which may be the entity that tracks resource availability of the memory controller. Such tracking may be by way of one or more credit trackers that indicate a resource level in the memory controller. For example, a home agent may include a read credit tracker and a write credit tracker to indicate a level of credits available for these different types of transactions in the memory controller. In addition to considering the credit level, in some embodiments a home agent may further include one or more queuing structures to store pending requests to the memory controller. The level of such structures also may be considered in determining memory controller resource availability.

If it is determined that such resource availability exists, control passes to block 480 where the memory request may be sent directly to the memory controller from the cache controller. In parallel with this memory request, the request also may be sent to the home agent, as the home agent performs various processing on the memory request to be able to handle completion of the memory request, e.g., by the return of data requested by a read request. By sending this memory request in parallel to these two different locations, reduced latency may occur. Note that the parallel nature of this communication need not be simultaneous, e.g., within the same clock cycle. It is possible for the cache controller to send the request in parallel in a concurrent or nearly concurrent manner. Note that in any event, the communication of the memory request to these two different locations enables each of these destinations to perform its processing in a potentially latency-reduced manner, as the pipelined processing within the home agent can occur in parallel with the memory controller handling the memory request.

Instead if it is determined that there is no availability for bypass communication, e.g., due to a lack of resource availability in the memory controller or for another reason, control passes from diamond 460 to block 470 where the memory request can be sent to the home agent for handling. Here, greater latency occurs as the pipeline processing within the home agent is performed before the memory request is sent to the memory controller. Although shown at this high level in the embodiment of FIG. 4, understand the scope of the present invention is not limited in this regard.

In some embodiments, an interconnect fabric may include multiple virtual channels or networks including one or more dedicated virtual networks dedicated to communication of transactions of particular message classes, and one or more shared virtual networks. In one such embodiment, a fabric includes a shared virtual network (referred to herein as VN0), which is a deadlock-free virtual network to provide a mechanism for independent progress per virtual channel beyond another shared virtual network (referred to herein as VNA), which is shared across all message classes.

Scenarios could exist in this implementation where one message class acquires all VNA credits, which blocks progress on another message class due to unavailability of resources. This dependency between message classes could create deadlocks in which message class dependency rules are violated. The VN0 network provides independent progress per message class. However, given implementation constraints, reserving an ingress entry per CHA per message class may be prohibitive.

Embodiments provide a shared credit interconnect such as ring that provides a time-multiplexed mechanism for multiple CHAs to share a single VN0 credit (per message class) through a single wire that traverses the CHAs. This credit mechanism for the shared virtual network allows integrated home agents and caching agents of a CHA to independently make forward progress for their respective pipelines even though to the credit system the CHA appears as a single entity. In addition, speculative acquisition of credits by one or more of the constituent agents may be prevented to ensure that both agents can share the same VN0 buffers.

Figure 5:
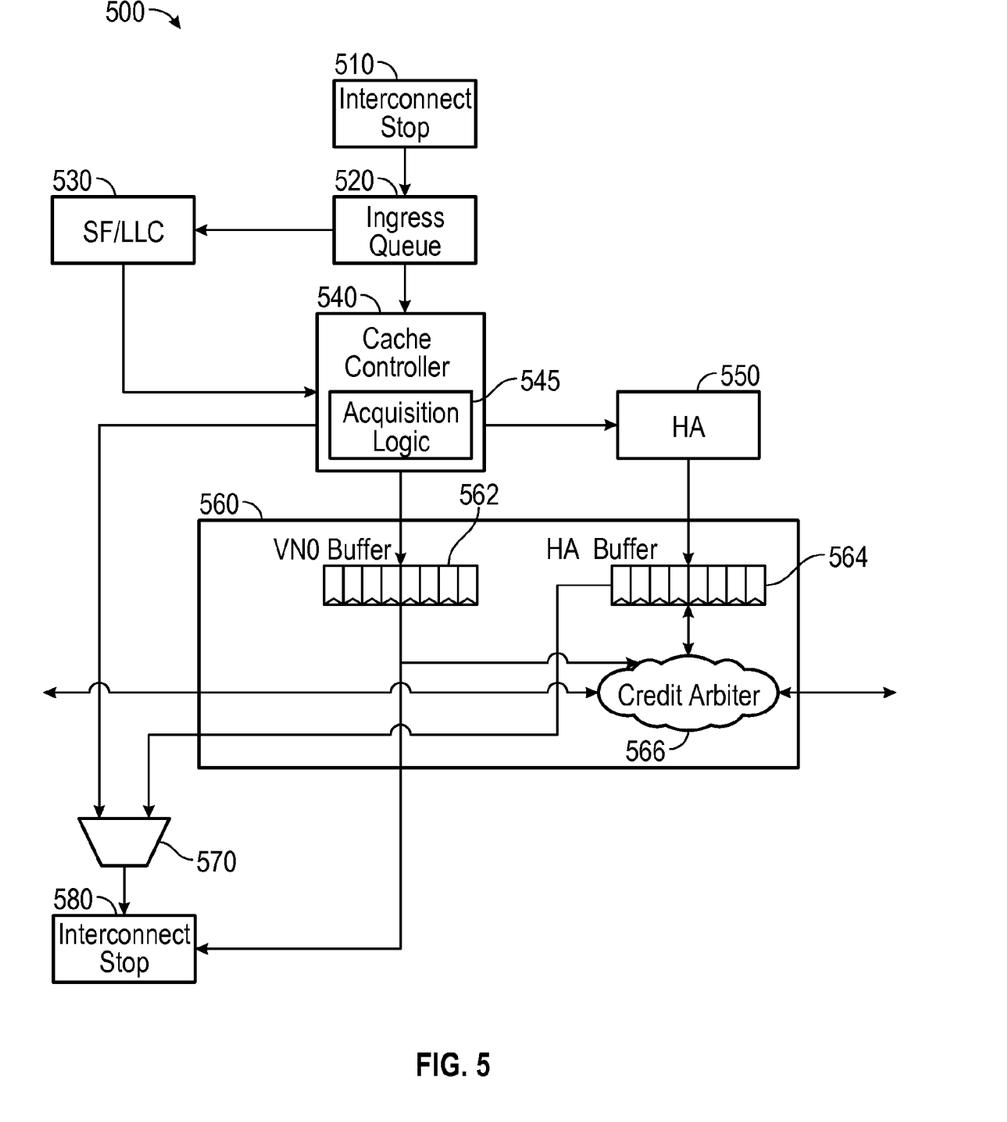
FIG. 5 is a block diagram of a CHA in accordance with another embodiment of the present invention.

Referring now to FIG. 5, shown is a block diagram of a CHA in accordance with another embodiment of the present invention. In the embodiment of FIG. 5, CHA 500 is configured similarly to CHA 300 of FIG. 3. However, note here further details regarding certain of the components are shown. Specifically FIG. 5 shows that cache controller 540 includes an acquisition logic 545 that may be used in part to acquire a token to enable a message to be sent from cache controller 540 out of the CHA via an egress buffer 570 and onto an interconnect stop 580. In addition, a staging buffer 560 includes separate buffers on queues 562 and 564 for information associated with requests received from cache controller 540 and home agent 550, respectively. In general, these storages may include an entry for each type of message class that a given agent can send, and may be used to receive incoming requests desired to be sent via a shared virtual network. As further shown in FIG. 5, staging buffer 560 further includes a credit arbiter 566 that interfaces with a credit interconnect such as a credit ring. As will be described further below, credit arbiter 566 may obtain a credit for this shared virtual network and enable a selected request from one of cache controller 540 and home agent 550 to be communicated via this shared virtual network.

As further shown in FIG. 5, CHA 500 includes an ingress queue 520 configured to receive incoming requests from an interconnect stop 510 and a snoop filter/LLC 530 that may receive lookup requests and provide responses (e.g., hit or miss responses) to cache controller 540. In other respects, CHA 500 may be configured similarly to CHA 300 of FIG. 3, discussed above.

In an embodiment, access to VN0 is implemented using a VN0 staging buffer credit or token with a reserved egress entry queue per message class, but not per port. This allows both agents of a CHA to track a single VN0 credit per message class. Note that this credit is not shared between CHAs. For example, each CHA could have a message allocated in the reserved egress entry for the same message class concurrently, but only one CHA can acquire the shared VN0 credit and allow that particular message to make forward progress from the corresponding CHA at a time.

The credit ring acquisition/release may be implemented within an egress portion of a CHA that obtains a VN0 credit if it has an entry pending in the VN0 portion of staging buffer 560. Thus the credit mechanism used herein is a two-stage allocation which enables home agent/caching agent sharing, and prevents the speculative acquisition of a credit in a retry-based cache pipeline. Embodiments may thus resolve forward progress issues for the CHA, and provide a capability to guarantee forward progress without speculative acquisition of shared virtual network (VN0) credits through a retry-based caching agent, avoiding complexity. More specifically, a single token/credit may be used to represent multiple structures, e.g., a shared virtual network and an egress queue in order to simplify forward progress.

Each of the CHA agents may seek to acquire VN0 credits in order to guarantee forward progress for its messages. In an example embodiment, a caching agent may send messages of a number of different message classes, including request (REQ), response (RSP), writeback (WB), non-coherent shared (NCS), or non-coherent bypass (NCB) messages, and a home agent may send messages of snoop (SNP), forward (FWD), or WB message classes.

In an embodiment, a CHA reserves one egress entry per message class. This amounts to 3 credits in a first egress and 4 credits in a second egress. In an example, each of these credits corresponds to a different and independent flow control class, and includes requests, snoops, non-data responses, data responses, memory writebacks, non-coherent standard and non-coherent bypass flow control classes. Each message class is allocated a separate reserved egress entry to guarantee independent forward progress. The entries are credited into the caching agent pipeline and acquired when the caching agent seeks to drive a particular message but does not have a corresponding VNA credit.

The message to be sent via the VN0 network is allocated into an egress buffer in a "blocked/disabled state," in that the message is waiting for a shared VN0 credit from the credit ring to be acquired in order to unblock it so that it can be output to an interconnect stop. In the meantime, the caching agent's state as included in buffer 562 in the staging buffer 560 may be set to a pending state to indicate that there is a pending cache message awaiting a VN0 credit. In response, credit arbiter 566 monitors the credit ring for a shared VN0 credit (which is shared amongst all CHAs) and acquires that credit when observed as available. That VN0 credit is guaranteed to be used, and is the trigger to unblock the message pending in the egress buffer. Using this technique, speculative allocation of shared tokens may be avoided. Thus once a shared credit is allocated, it is guaranteed to be consumed since the message that triggered the acquisition is already pending in the egress buffer waiting to be sent to an interconnect stop. Embodiments having a two-stage allocation may have minimal buffering overhead (e.g., 1 reserved egress entry per message class).

As shown in FIG. 5, staging buffer 560 also implements a dedicated buffer 564 for home agent requests. Home agent requests that allocate a VN0 credit include snoop, forward and non-snoop write messages for memory migration, in an embodiment. If a home agent message is unable to acquire a VNA credit, arbiter 566 allocates a VN0 credit to this message. As an example, arbiter 566 operates according to a round-robin arbitration scheme to select between home agent and caching agent messages. The round-robin acquisition of shared VN0 credits between these two agents' messages guarantees fairness to ensure that neither is starving the other out. Embodiments thus may be used to provide a forward progress guarantee for a high performance coherence controller, while achieving power efficiency and scalability.

Figure 6:
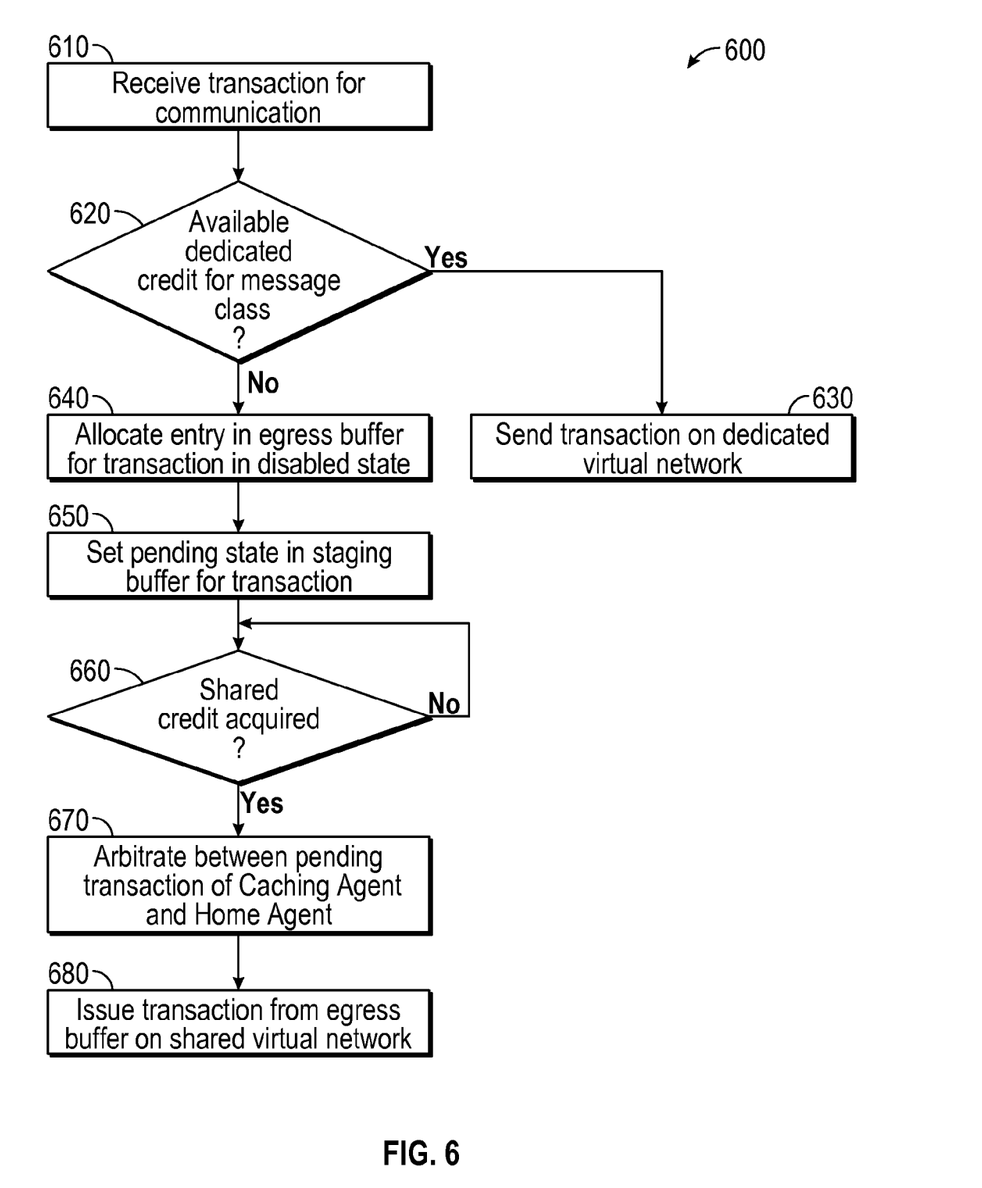
FIG. 6 is a flow diagram of a method for accessing a shared virtual network in accordance with an embodiment of the present invention.

Referring now to FIG. 6, shown is a flow diagram of a method for accessing a shared virtual network in accordance with an embodiment of the present invention. As shown in FIG. 6, method 600 may be implemented using various circuits present within a CHA having an integrated caching agent and home agent. In the embodiment shown in FIG. 6, method 600 begins by receiving a transaction for communication (block 610). This transaction may be received in the CHA via an interconnect stop and may pass through appropriate channels to the caching agent and/or home agent. Then when a request is made, the transaction is provided to a staging buffer, which includes logic to handle processing of the incoming requests or transactions.

Next at diamond 620, it is determined whether a dedicated credit is available for the message class for the type of transaction. If so, control passes to block 630 where the transaction may be sent on this dedicated virtual network. In other instances, the determination at diamond 620 indicates that there is no available dedicated credit. Accordingly, control passes to block 640 where an entry in an egress buffer is allocated for this transaction. More specifically, this entry may be allocated in a disabled state. For example, the caching agent and/or the home agent may insert an entry directly into the egress buffer in this disabled state, meaning that the desired transaction does not have an available credit for its immediate transmission. Furthermore, the agent that allocates this entry into the egress buffer may also set a pending state in a staging buffer for this transaction (block 650). In an example, each agent includes a set of buffers within the staging buffer to store information regarding requests that identify the message class, a pointer to the location of the actual request within the egress queue, and a target port for the transaction, among other possible information.

Still referring to FIG. 6, next it is determined whether a shared credit is acquired (diamond 660). In an embodiment, a credit arbiter of the staging buffer obtains a shared credit from a credit ring when it is available. Here because the arbiter does not seek to acquire the credit until one or more entries are present in an egress buffer in a disabled state (and also in a pending state in the staging buffer) it is guaranteed that this credit is not speculative and will be consumed. Then at block 670 the arbiter arbitrates between pending transactions of the caching agent and the home agent to select an appropriate transaction for sending. Thus at block 680 the selected transaction is issued from the egress buffer on the shared virtual network. Although shown at this high level in the embodiment of FIG. 6, understand the scope of the present invention is not limited in this regard.

Figure 7:
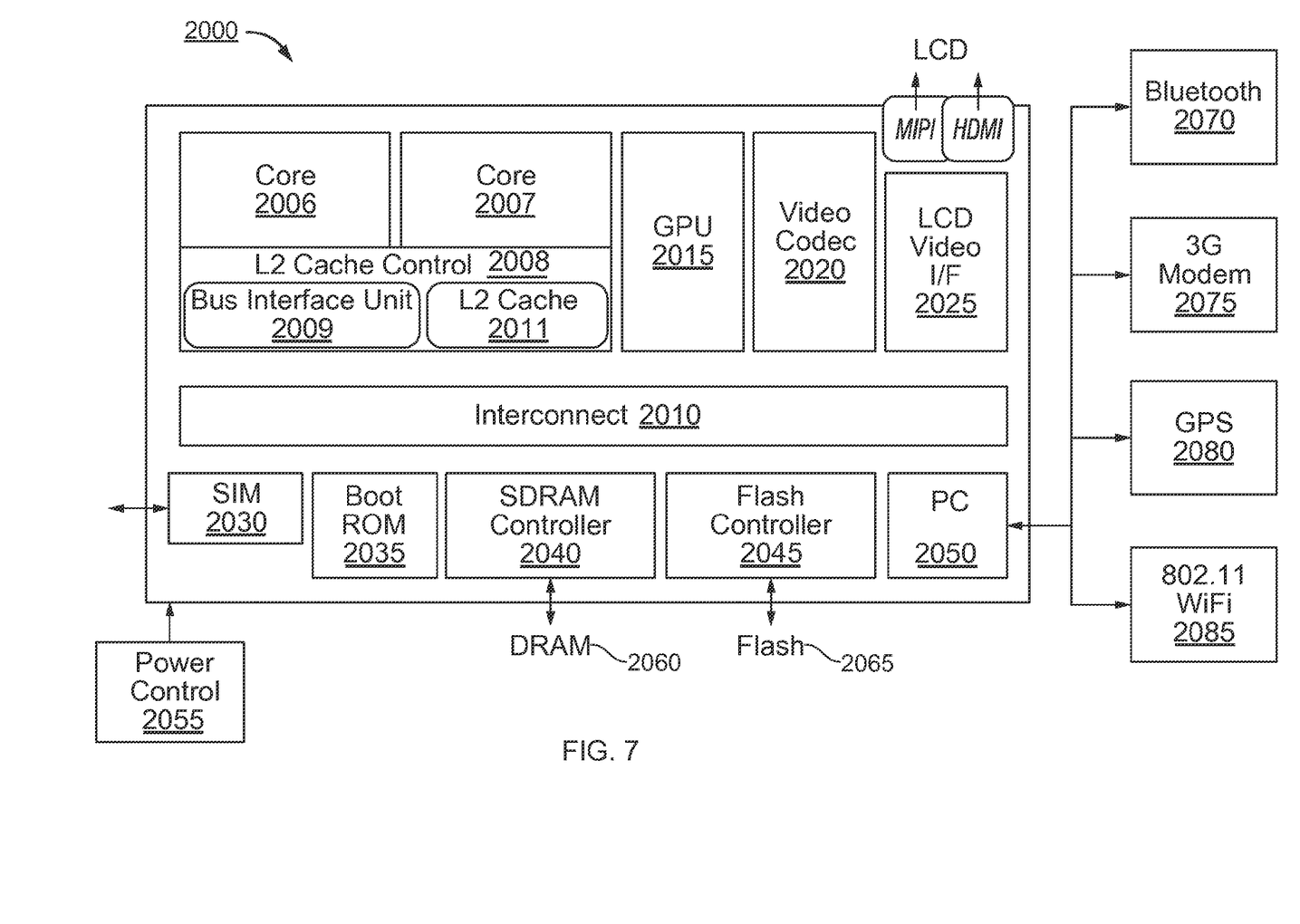
FIG. 7 is an embodiment of a system on-chip (SOC) design in accordance with an embodiment.

Turning next to FIG. 7, an embodiment of a system on-chip (SOC) design in accordance with an embodiment is depicted. As a specific illustrative example, SOC 2000 is included in user equipment (UE). In one embodiment, UE refers to any device to be used by an end-user to communicate, such as a hand-held phone, smartphone, tablet, ultra-thin notebook, notebook with broadband adapter, or any other similar communication device. Often a UE connects to a base station or node, which potentially corresponds in nature to a mobile station (MS) in a GSM network.

Here, SOC 2000 includes 2 cores—2006 and 2007. Similar to the discussion above, cores 2006 and 2007 may conform to an Instruction Set Architecture, such as an Intel® Architecture Core™-based processor, an Advanced Micro Devices, Inc. (AMD) processor, a MIPS-based processor, an ARM-based processor design, or a customer thereof, as well as their licensees or adopters. Cores 2006 and 2007 are coupled to cache control 2008 that is associated with bus interface unit 2009 and L2 cache 2011 to communicate with other parts of system 2000. Interconnect 2010 includes an on-chip interconnect, such as an IOSF, AMBA, or other interconnect discussed above, which potentially implements one or more aspects described herein.

Interconnect 2010 provides communication channels to the other components, such as a Subscriber Identity Module (SIM) 2030 to interface with a SIM card, a boot ROM 2035 to hold boot code for execution by cores 2006 and 2007 to initialize and boot SOC 2000, a SDRAM controller 2040 to interface with external memory (e.g. DRAM 2060), a flash controller 2045 to interface with non-volatile memory (e.g. Flash 2065), a peripheral controller 2050 (e.g. Serial Peripheral Interface) to interface with peripherals, video codecs 2020 and Video interface 2025 to display and receive input (e.g. touch enabled input), GPU 2015 to perform graphics related computations, etc. Any of these interfaces may incorporate aspects described herein.

In addition, the system illustrates peripherals for communication, such as a Bluetooth module 2070, 3G modem 2075, GPS 2080, and WiFi 2085. Also included in the system is a power controller 2055. Note as stated above, a UE includes a radio for communication. As a result, these peripheral communication modules are not all required. However, in a UE some form a radio for external communication is to be included.

The following examples pertain to further embodiments.

In one example, a processor comprises: at least one core; a caching home agent coupled to the at least one core and including a cache controller to receive a read request for data and, responsive to the data not being present in a cache memory associated with the cache controller, to issue a memory request to a memory controller to request the data in parallel with communication of the memory request to a home agent, and the home agent to receive the memory request from the cache controller and to reserve an entry for the memory request; and the memory controller coupled to the caching home agent, where the memory controller is to communicate with a memory coupled to the processor.

In an example, the cache controller is to issue the memory request to the memory controller in parallel with the memory request communication to the home agent responsive to an indication from the home agent of resource availability in the memory controller. And, the cache controller is not to issue the memory request to the memory controller in parallel with the memory request communication to the home agent responsive to an indication from the home agent of resource unavailability in the memory controller.

In an example, the home agent is to determine the resource availability based at least in part on a credit level maintained by the home agent for the memory controller. The home agent may also register the memory request in a tracker and not send the memory request to the memory controller when the resource availability indication is active.

In an example, the home agent is to receive a response to the memory request from the memory, to associate the response with the registered memory request, and to provide the data to a requester. The caching home agent may further include, in an embodiment, an ingress queue coupled to a first interconnect port to store incoming requests including the read request received via the first interconnect port and a staging buffer coupled to the home agent to store pending memory requests and to output the pending memory requests via a second interconnect port coupled to the staging buffer.

In an example, the caching home agent further includes a snoop filter coupled to the cache controller, where the cache controller is to issue the memory request to the memory controller in parallel with the memory request communication to the home agent responsive to the data not being present in distributed portions of the cache memory. The cache controller may issue the memory request to the memory controller based at least in part on a load of the processor, where issuance of the memory request to the memory controller is to reduce a latency of data return to a requester.

Note that the above processor can be implemented using various means.

In an example, the processor comprises a SoC incorporated in a user equipment touch-enabled device.

In another example, a system comprises a display and a memory, and includes the processor of one or more of the above examples.

In another example, a method comprising: receiving a miss indication in a cache controller of a CHA, when a read request misses in a cache memory associated with the CHA; sending the read request from the cache controller to a memory controller coupled to the CHA responsive to a resource availability indicator, the resource availability indicator to indicate that the memory controller has sufficient resources to handle the read request; and sending the read request to a home agent of the CHA to reserve a resource in the home agent to receive a completion for the read request.

In an example, the resource availability indicator may be received from the home agent based on a credit level associated with the memory controller. The method may further include receiving the read request from an ingress queue of the CHA coupled to a first stop of an interconnect mesh, and sending the read request to the memory controller via a second stop of the interconnect mesh.

In an example, the method may further include, instead sending the read request to the memory controller from the home agent and not from the cache controller, responsive to the resource availability indicator indicating that the memory controller has insufficient resources.

In an example, the method may further include receiving data responsive to the read request in the home agent and associating the data with the reserved resource, and communicating the data to a requester. The method may further include receiving the data in the home agent with a first latency when the cache controller sends the read request to the memory controller and receiving the data in the home agent with a second latency when the home agent sends the read request to the memory controller, the first latency less than the second latency.

In an example, the method further includes sending the read request to the memory controller from the cache controller based at least in part on a workload of the memory controller.

In another example, a computer readable medium including instructions is to perform the method of any of the above examples.

In another example, an apparatus comprises means for performing the method of any one of the above examples.

In another example, an apparatus comprises: a core to execute instructions; and an integrated CHA coupled to the core to interface the core to a cache memory and a memory coupled to the apparatus. The integrated CHA may include: a caching agent to receive an incoming request and to determine if the incoming request corresponds to a location in the cache memory, and if not to send the incoming request to a home agent; the home agent to reserve an entry for the incoming request in a tracker; a staging buffer coupled to the caching agent and the home agent and including a first plurality of entries each to store information regarding a caching agent request of a given message class and a second plurality of entries each to store information regarding a home agent request of a given message class; and a credit arbiter coupled to a credit interconnect to obtain a credit for insertion of a request onto a shared virtual network and to provide a grant to one of the home agent and the caching agent to enable a corresponding request to be communicated along the shared virtual network.

In an example, the credit arbiter is to provide the grant according to a multi-stage allocation mechanism.

The apparatus may further include, in an example, an egress buffer coupled to the caching agent and the home agent, where the caching agent is to allocate a request to the egress buffer in a blocked state. The egress buffer may unblock and communicate the request to an interconnect interface responsive to receipt of a grant indication for the caching agent.

In an example, the caching agent is to issue the incoming request to a memory controller in parallel with sending the incoming request to the home agent responsive to an indication from the home agent of resource availability in the memory controller. The home agent may register the incoming request in a tracker and not send the incoming request to the memory controller when the resource availability indication is active, and may receive a response to the memory request from the memory, to associate the response with the registered incoming request, and to provide the data to a requester.

In an example, a memory controller is coupled to the integrated CHA, where the memory controller is to communicate with a memory coupled to the apparatus. The caching agent may send the incoming request to the memory controller and the home agent in parallel when a load of the memory controller is less than a threshold level to reduce a latency of data return to a requester, and otherwise the caching agent may send the incoming request to the home agent only.

In another example, at least one computer readable medium includes instructions that when executed enable a system to: allocate, via a caching agent of an integrated CHA of a processor, an entry in an egress buffer of the integrated CHA for a read request that misses in a local portion of a cache memory and set a disabled state for the entry; set a pending state in a portion of a staging buffer of the integrated CHA associated with the caching agent; and send the read request from the egress buffer to a memory coupled to the processor via a shared virtual network, responsive to acquisition of a shared credit obtained via a credit interconnect coupled to the integrated CHA.

In an example, instructions may further enable the system to arbitrate between pending requests of the caching agent and a home agent of the integrated CHA, and to send the read request responsive to selection of the read request. In addition, instructions may enable the system to determine whether an available credit is present for the read request, and if so, to communicate the read request to the memory via a dedicated virtual network.

In an example, the shared credit represents both an entry in the egress buffer and an entry in the staging buffer, and an arbiter of the integrated CHA is to select the read request responsive to presence of the entry in the egress buffer in the disabled state and the pending state in the portion of the staging buffer. Instructions may further enable the system to allocate the entry in the egress buffer concurrently with sending the read request to a home agent of the integrated CHA. Still further instructions may enable the system to concurrently allocate the entry when a memory controller of the processor has resource availability for the read request.

Understand that various combinations of the above examples are possible.

Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A processor comprising:
   a plurality of cores;
   a caching home agent coupled to the plurality of cores to serve as a local coherence and cache controller and a global coherence and memory controller interface and including:
      a cache controller to receive a read request for data and, responsive to the data not being present in a cache memory associated with the cache controller and an indication from a home agent of resource availability in a memory controller, to issue a memory request directly to the memory controller via a bypass path to request the data in parallel with communication of the memory request to the home agent, wherein the bypass path is to circumvent the home agent;
   the caching home agent further including:
      the home agent to receive the memory request from the cache controller and to reserve an entry for the memory request; and
   the memory controller coupled to the caching home agent, wherein the memory controller is to communicate with a memory coupled to the processor.

2. The processor of claim 1, wherein the cache controller is not to issue the memory request to the memory controller in parallel with the memory request communication to the home agent responsive to an indication from the home agent of resource unavailability in the memory controller.

3. The processor of claim 1, wherein the home agent is to determine the resource availability based at least in part on a credit level maintained by the home agent for the memory controller.

4. The processor of claim 1, wherein the home agent is to register the memory request in a tracker and to not send the memory request to the memory controller when the resource availability indication is active.

5. The processor of claim 1, wherein the home agent is to receive a response to the memory request from the memory, to associate the response with the registered memory request, and to provide the data to a requester.

6. The processor of claim 1, wherein the caching home agent further comprises:
   an ingress queue coupled to a first interconnect port to store incoming requests including the read request received via the first interconnect port; and
   a staging buffer coupled to the home agent to store pending memory requests and to output the pending memory requests via a second interconnect port coupled to the staging buffer.

7. The processor of claim 6, wherein the caching home agent further comprises a snoop filter coupled to the cache controller, wherein the cache controller is to issue the memory request to the memory controller in parallel with the memory request communication to the home agent responsive to the data not being present in distributed portions of the cache memory, each of the distributed portions of the cache memory associated with a different core of the plurality of cores.

8. The processor of claim 1, wherein the cache controller is to issue the memory request to the memory controller based at least in part on a load of the processor, wherein issuance of the memory request to the memory controller is to reduce a latency of data return to a requester.

9. A method comprising:
   receiving a miss indication in a cache controller of a caching home agent (CHA), when a read request misses in a cache memory associated with the CHA;
   sending the read request from the cache controller to a memory controller coupled to the CHA via a bypass path to couple the CHA to the memory controller and circumvent a home agent of the CHA responsive to generated by the home agent, the resource availability indicator to indicate that the memory controller has sufficient resources to handle the read request; and
   responsive to the miss indication, sending the read request from the cache controller to the home agent of the CHA to reserve a resource in the home agent to receive a completion for the read request in parallel with sending the read request from the cache controller to the memory controller.

10. The method of claim 9, further comprising receiving the resource availability indicator from the home agent based on a credit level associated with the memory controller.

11. The method of claim 9, further comprising receiving the read request from an ingress queue of the CHA coupled to a first stop of an interconnect mesh, and sending the read request to the memory controller via a second stop of the interconnect mesh.

12. The method of claim 9, further comprising sending the read request to the memory controller from the home agent and not via the bypass path from the cache controller, responsive to the resource availability indicator indicating that the memory controller has insufficient resources.

13. The method of claim 12, further comprising receiving data responsive to the read request in the home agent and associating the data with the reserved resource, and communicating the data to a requester.

14. The method of claim 13, further comprising receiving the data in the home agent with a first latency when the cache controller sends the read request to the memory controller and receiving the data in the home agent with a second latency when the home agent sends the read request to the memory controller, the first latency less than the second latency.

15. The method of claim 9, further comprising sending the read request to the memory controller from the cache controller based at least in part on a workload of the memory controller.

16. An apparatus comprising:
   a plurality of cores to execute instructions; and
   an integrated caching home agent (CHA) coupled to the plurality of cores to interface the plurality of cores to a cache memory and a memory coupled to the apparatus, the integrated CHA including:
      a caching agent to receive an incoming request and to determine if the incoming request corresponds to a location in the cache memory, and if not to send the incoming request to a home agent of the integrated CHA and issue the incoming request to a memory controller in parallel with sending the incoming request to the home agent, the issuance of the incoming request to the memory controller via a bypass path that circumvents the home agent, responsive to an indication from the home agent of resource availability in the memory controller;
      the home agent to reserve an entry for the incoming request in a tracker included in the home agent;
      a staging buffer coupled to the caching agent and the home agent and including a first plurality of entries each to store information regarding a caching agent request of a given message class and a second plurality of entries each to store information regarding a home agent request of a given message class; and
      a credit arbiter coupled to a credit interconnect to obtain a credit for insertion of a request onto a shared virtual network and to provide a grant to one of the home agent and the caching agent to enable a corresponding request to be communicated along the shared virtual network.

17. The apparatus of claim 16, wherein the credit arbiter is to provide the grant according to a multi-stage allocation mechanism.

18. The apparatus of claim 16, further comprising an egress buffer coupled to the caching agent and the home agent, wherein the caching agent is to allocate a request to the egress buffer in a blocked state.

19. The apparatus of claim 18, wherein the egress buffer is to unblock and communicate the request to an interconnect interface responsive to receipt of a grant indication for the caching agent.

20. The apparatus of claim 16, wherein the home agent is to register the incoming request in a tracker and not send the incoming request to the memory controller when the resource availability indication is active, and to receive a response to the memory request from the memory, to associate the response with the registered incoming request, and to provide the data to a requester.

21. The apparatus of claim 16, wherein the memory controller is coupled to the integrated CHA, wherein the memory controller is to communicate with the memory coupled to the apparatus.

22. The apparatus of claim 21, wherein the caching agent is to send the incoming request to the memory controller and the home agent in parallel when a load of the memory controller is less than a threshold level to reduce a latency of data return to a requester, and otherwise the caching agent is to send the incoming request to the home agent only.

* * * * *